United States Patent
Byron

(10) Patent No.: US 11,167,466 B2
(45) Date of Patent: Nov. 9, 2021

(54) METHOD OF FORMING POLYPROPYLENE BOTTLES

(71) Applicant: Kent Byron, New Iberia, LA (US)

(72) Inventor: Kent Byron, New Iberia, LA (US)

(*) Notice: Subject to any disclaimer, the term of this patent is extended or adjusted under 35 U.S.C. 154(b) by 223 days.

(21) Appl. No.: 16/218,999

(22) Filed: Dec. 13, 2018

(65) Prior Publication Data

US 2019/0184622 A1 Jun. 20, 2019

Related U.S. Application Data

(60) Provisional application No. 62/598,236, filed on Dec. 13, 2017.

(51) Int. Cl.
| | |
|---|---|
| *B29C 49/06* | (2006.01) |
| *B29C 49/64* | (2006.01) |
| *B29C 49/12* | (2006.01) |
| *B29C 49/00* | (2006.01) |
| *B29C 49/28* | (2006.01) |
| *B29C 49/78* | (2006.01) |
| *B29K 23/00* | (2006.01) |
| *B29L 31/00* | (2006.01) |

(52) U.S. Cl.
CPC .......... *B29C 49/06* (2013.01); *B29C 49/0005* (2013.01); *B29C 49/12* (2013.01); *B29C 49/28* (2013.01); *B29C 49/6436* (2013.01); *B29C 49/78* (2013.01); *B29K 2023/12* (2013.01); *B29L 2031/7158* (2013.01)

(58) Field of Classification Search
None
See application file for complete search history.

(56) References Cited

U.S. PATENT DOCUMENTS

| | | |
|---|---|---|
| 4,592,719 A | 6/1986 | Bellehache et al. |
| 5,229,142 A | 7/1993 | Yokobayashi |
| (Continued) | | |

FOREIGN PATENT DOCUMENTS

WO WO-2013069426 A1 * 5/2013 ........... B29C 49/063

OTHER PUBLICATIONS

Translation of WO 2013/069426 (Year: 2013).*
(Continued)

*Primary Examiner* — Marc C Howell
*Assistant Examiner* — John J DeRusso
(74) *Attorney, Agent, or Firm* — Jones Walker LLP

(57) ABSTRACT

A method of manufacturing a polypropylene vessel using a single-step injection stretch blow molding machine using a heat-conditioning step. The method may include providing a chemical composition comprising polypropylene, forming a preform vessel of the chemical composition in a second shape, heating the preform vessel at a plurality of positions on the preform vessel with heat pots, wherein each of the heat pots is configured to heat a corresponding one of the plurality of positions on the preform vessel by raising a temperature of the heat pot to a respective temperature, wherein each respective temperature of each of the heat pots is different from another respective temperature of another of the heat pots, wherein the temperatures of the heat pots are based on the desired first shape of the product. The method may include forming, from the heated and expanded preform, a second vessel in a desired first shape.

25 Claims, 15 Drawing Sheets

(56) References Cited

U.S. PATENT DOCUMENTS

| | | | |
|---|---|---|---|
| 5,283,026 | A | 2/1994 | Okumura et al. |
| 6,109,907 | A | 8/2000 | Takada et al. |
| 6,186,760 | B1 | 2/2001 | Latham |
| 7,241,850 | B2 | 7/2007 | Burmaster et al. |
| 2003/0173718 | A1 | 9/2003 | Wunderlich |
| 2005/0104263 | A1 | 5/2005 | Larsen |
| 2006/0035045 | A1 | 2/2006 | Batlaw et al. |
| 2006/0290035 | A1 | 12/2006 | Yoshiike et al. |
| 2008/0220114 | A1 | 9/2008 | Lefebure et al. |
| 2011/0094922 | A1 | 4/2011 | Carew |
| 2012/0085071 | A1* | 4/2012 | Hahn ............... B29C 49/78 53/411 |
| 2013/0189385 | A1* | 7/2013 | Zoppas ............ B29B 13/02 425/3 |
| 2014/0131920 | A1 | 5/2014 | Nakahara |
| 2018/0257264 | A1 | 9/2018 | Kawamura et al. |
| 2020/0307064 | A1* | 10/2020 | Finger ............... B29C 49/68 |

OTHER PUBLICATIONS

International Search Report and Written Opinion dated Apr. 18, 2019, from Applicant's counterpart International Patent Application No. PCT/US2018/65418.

* cited by examiner

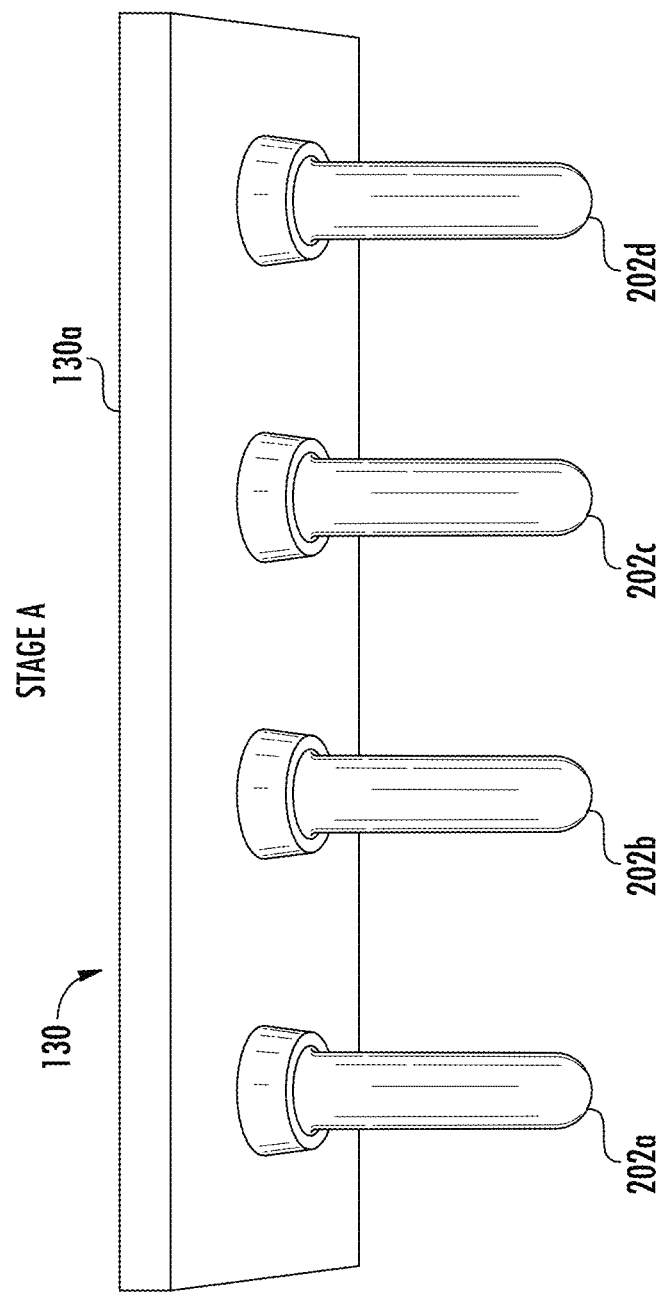

ASB 70DPH PROCESS PROFILE

Date: 11/27/2018  Process Engineer: _____  Mold: R&D  Mold#: _____  Mach#: 11
Resin: PP  Resin Lot#: _____  Design#: _____  Product: 24oz NVP
Color/Additive: Clear  Color/Additive Lot #: _____  LDR: _____  # of Cavities: 4

INJECTION BERREL Temp. (C)

Nozzle 230  Front 230  Middle 230  Rear 230
HOT RUNNER (C) — Block 1: 230  1: 205  End R: 220  L: 235  Sprue: 230  Balance: ___
Nozzle (°C) 1: 180  2: 180  3: 180  4: ___  5: 180  6: ___  7: ___  8: ___  9: ___  10: ___  11: ___  12: ___

Molding conditions

Scew Diameter (mm): .54  Intensification Ratio: 10:01

| Molding conditions | | CONDITIONING | 1 | 2 | 3 | 4 | 5 | 6 | 7 | 8 | 9 | 10 | 11 | 12 |
|---|---|---|---|---|---|---|---|---|---|---|---|---|---|---|
| Gram Weight (gr.) | | Cores (°F) | | | | | | | | | | | | |
| Cycle Time (sec.) | 23.86 | | | | | | | | | | | | | |
| In mold Time (sec.) | 15.00 | | | | | | Pots (cu) or ☐ Aurora Light System (%) | | | | | | | |
| Dryer Temp (°F) | N/A | Upper | 175 | 180 | 180 | 165 | | | | | | | | |
| Low Air Press (psi) | 232 | Middle | 100 | 120 | 135 | 130 | | | | | | | | |
| **High Air Press (psi) | 275 | Middle | OFF | OFF | OFF | OFF | | | | | | | | |
| ****Min high air (psi) | | Bottom | 215 | 235 | 225 | 225 | | | | | | | | |
| Str. Rod Speed | 25% | | | | | | Preferential Heat | | | | | | | |
| Chiller Wtr Temp (°F) | 55 | Temp.(°C) | | | | | | | | | | | | |
| Blow Mold Temp (°F) | 55 | Postion () | 135 | 0 | 135 | 0 | | | | | | | | |

* The position of the pot starting at inboard, rotation clockwise, the value should be 0°, 45°, 90°, 135°, 180°, 225°, 270°, 315°

Push-up Delay
Push-Up Temp (°F): 80

| Inj Core Flow (gpm) | | Inj Control pg1 | | | | | Inj Control Pg2 | | |
|---|---|---|---|---|---|---|---|---|---|
| **Inj Core Press (psi) | | Timer Set Position (mm) | | | | | Position PN1 ~~~~ mm | | |
| Inj Cavity Flow (gpm) | | M1 | P-V | 3-2 | 2-1 | | RPM | mpa | Vol% |
| **Inj Cav Press (psi) | | 2.00 | 30.0 | 60.0 | 100.0 | | Screw Bw | 5.0 | 90.0% |
| | | | | Shot Size | 123.0 | | Unload | 0.5 | 0.4% |
| | | (fill) V-P sec. | | | 1.89 | | Inj unit Fw | 4.0 | 50.0% |

Inject Timers

| | | | | | | | | | |
|---|---|---|---|---|---|---|---|---|---|
| 33 Injection Time | 12.00 | (mpa) | 5 | 4 | 3 | 2 | 1 | Inj unit Bw | 4.0 | 30.0% |
| 34 Cond. Time | 3.00 | Press | 4.5 | 4.5 | 10.0 | 10.0 | 100.0 | Suck Back | 9.0 | 99.0% |
| 35 Inject. Start | 0.50 | Vol% | 70.0% | 70.0% | 70.0% | 70.0% | 70.0% | S(m) | 12.0 | |
| 36 Srew Start | 0.20 | | | | | | | (mpa) | 1 | 2 |
| 37 Srew Decom. | 2.75 | Blower Timers | | | | | | Press | 8.0 | 8.0 |
| 38 Hr Vgate Close | 0.00 | 55 Blow Time | 10.00 | 68 Inj Open slow T. | 0.00 | | | Vol% | 65.0% | 65.0% |
| 39 Hr Vgate open | 0.00 | 56 Blow Decomp | 2.00 | 76 BC Down Start | 0.50 | | | Over Pack | 3.5 | mm |
| 50 Shut Off Close | 0.20 | 101 Pirmary Air | 0.30 | 77 BC Hold Fw St. | 0.50 | | | Short | 90.0 | mm |

Cond. Timers

| | | | | | |
|---|---|---|---|---|---|
| | | 126 Secondary Air | 0.50 | 78 BC Up Start | 0.00 | |
| 41 T/C Down St. | 0.00 | 59 Cooling blow T. | 0.00 | 83 BM CL Slow Time | 0.50 | |
| 42 T/C Down Time | 0.00 | 51 Strech Down St. | 0.00 | 84 BM CL Time | | 81 Blow Lock Fw St. | 0.00 |
| 43 Pot Up Start | 6.00 | 53 Strech Time | 2.00 | 85 BM CL Decom T | 0.50 | 89 Pref Cool Fw | 0.00 |
| 44 Pot Up Time | 12.00 | 96 Push-Up Delay | 0.00 | 87 BM Open Slow T. | 0.50 | 90 Pref Cool Fw T | 0.00 |
| 45 Con. Blow St. | 0.30 | Hidden Timers | | 97 Push-up Dw St | 0.50 | 65 Screw Speed T | 1.00 |
| 46 Con. Blow Time | 0.00 | 60 Splits Close St. | ~0.15~ | 91 Lock Pine Up St. | 0.00 | 66 Nozzle Fw St. | 0.00 |
| 47 Con. Blow Decom | 0.00 | 62 Splits Slow Tm | 0.15 | 92 Lock Pine Dw St. | 0.10 | 67 Nozzle Bw St | 0.00 |
| | | 70 Slide Plate Fw St. | 0.50 | 93 Rotation Start | 0.20 | 99 T. Error V-P | 50.00 |
| | | 71 Main Ram Fw St. | 0.25 | 63 Eject Dw Start | 0.50 | 100 Time Error | 50.00 |
| | | 58 Inj Clamp time | 0.20 | 64 Eject Dw Time | 2.00 | Change | |

** max inj core & cav water pressure as 85 psi
*** max high air pressure 450psi unless approved by the PE
**** Minimum air pressure required for a good sameple.

Theromalators
Hot Oil Thermalator — 150.00
Water Thermalator

Comments:

FIG. 10

24oz. PP Bottle: Hot Fill Testing

Water: Temperature 212 Degrees /Syrup: Temperature 206 Degrees

In picture below bottles expanded a little, which was expected. Water was filled all the way to the top.

24oz. PP Bottle: Hot Fill Testing

In picture above 3 bottles – left side PF1; 3 bottles- right side PF2 filled all the way to the top. As shown above water level came down.

In picture above bottles are filled to the fill line. As shown there is no drastic changed in the water level.

24oz. PP Bottle: Hot Fill Testing Test

Left- PF1: Right- PF2 Bottles are filled all the way to the top. Picture above is showing water level went back to the top after bottles are cool down.

Left: PF1; Right: PF2 filled to fill line. As shown bottle level did not change much.

24oz. PP Bottle: Hot Fill Testing

Left: PF2; Right- PF1 filled all the way to the top. Shown above level of syrup did go down.

After Cooling:

Left: PF2; Right: PF1 Picture above shows there are no changes in the level of the syrup.

METHOD OF FORMING POLYPROPYLENE BOTTLES

CROSS-REFERENCE TO RELATED APPLICATIONS

This application claims the benefit of and priority to U.S. Provisional Patent Application No. 62/598,236, filed on Dec. 13, 2017, which is incorporated herein by reference.

BACKGROUND

The disclosure relates to a method of manufacturing a polypropylene (PP) item, as for example, a bottle, using injection stretch blow molding.

Items such as plastic bottles may be formed of high density polyethylene (HDPE), low density polyethylene (LDPE), polyethylene terephthalate (PET), polypropylene (PP), and polyvinyl chloride (PVC). Each material provides certain benefits and has certain limitations. Additionally, certain plastic materials are better suited for use in certain molding processes.

Polypropylene bottles are conventionally manufactured using an extrusion blow molding process. The extrusion process allows for limited options in bottle designs. The creation of bottles with complex geometric shapes is not possible with the extrusion process. Additionally, the bottles formed with extrusion include port lines on threads, which decreases the effectiveness of the bottle's fluid seal with a cap.

Conventionally, injection stretch blow molding is used to form PET bottles having more complex geometric shapes. PET bottles are widely used and offer a cost-effective substitute to expensive glass bottles. This process involves injection molding a preform with the PET material, conditioning the preform by heating or cooling, positioning the preform in a mold, and stretching the preform with a stretch rod and applying a high pressure air stream to force the preform into the shape of the mold.

In a hot fill process, the contents to be packaged in a plastic bottle are heated (e.g., up to a temperature between 180° F. and 203° F.) in order to sterilize the contents before being placed inside the bottle. PET bottles formed with the conventional injection stretch blow molding process cannot withstand the liquid temperatures in the hot fill process because these PET bottles deform around 168° F.

For PET bottles to be used in the hot fill process, a heat-set manufacturing process must be used. In heat-set injection stretch blow molding for PET, the conditioning step is accomplished by placing the preform on spinning mandrels that travel through a cavity in which high-intensity LED lights apply heat to the preform. Additionally, this process includes two molding steps, with the second mold being heated to a high temperature to align the PET molecule chains. Because the PET molecule chains are aligned at this high temperature, the molecule chains will not rearrange when the PET bottle is used in the hot fill process. The heat-set injection stretch blow molding process requires expensive machines, heavier wall stocks to maintain rigidity, and longer cycle times. Accordingly, heat-set PET bottles are more expensive to produce.

SUMMARY

This disclosure addresses the problems and drawbacks of PET bottles by providing a novel method of manufacturing a polypropylene item, product, or vessel using a single-step injection stretch blow molding machine using a heat-conditioning step.

In one embodiment, the method may include a method of forming a product in a desired first shape. The method may include providing a chemical composition comprising polypropylene, and forming a preform vessel of the chemical composition in a second shape having an open end, wherein the preform vessel is at a first temperature, wherein selection of the second shape is based on the desired first shape. The method may include heating the preform vessel at a plurality of positions on the preform vessel with a plurality heat pots, wherein each of the heat pots is configured to heat a corresponding one of the plurality of positions on the preform vessel by raising a temperature of the heat pot to a respective temperature, wherein a respective temperature of a first one of the heat pots is different from another respective temperature of a second one of the heat pots, wherein the temperatures of the heat pots are based on the desired first shape of the product. The method may include advancing a nozzle into the open end of the heated preform vessel, covering the heated preform vessel and nozzle with a mold having a cavity with an internal surface shaped corresponding to the desired first shape, blowing air through the nozzle into the heated preform vessel, wherein the blown air is at a second temperature and expands the heated preform vessel to couple the expanded preform vessel with the internal surface of the cavity, and forming, from the expanded preform vessel and within the cavity, a second vessel in the desired first shape.

In one embodiment, at least a portion of the heat pots are annular in shape.

In one embodiment, the formed second vessel includes a threaded neck.

In one embodiment, the formed second vessel includes no vacuum panels.

In one embodiment, the providing, forming, heating, advancing, covering, blowing, and forming steps are performed with a single-step Injection Stretch Blow Molding (ISBM) machine.

In one embodiment, the single-step Injection Stretch Blow Molding (ISBM) machine is conventionally configured for molding PET.

In one embodiment, the heat pots are adjacent to the preform vessel during the heating.

In one embodiment, the chemical composition comprises a clarity agent.

In one embodiment, the formed second vessel has a property of holding liquid of between 204 degrees and 212 degrees without substantially deforming.

In one embodiment, the heating of the preform vessel at the plurality of positions comprises heating at a first position for a first time duration and heating at a second position for a second time duration.

In one embodiment, the first time duration is greater than the second time duration.

In one embodiment, the first time duration is between 2.5 and 3.5 seconds.

In one embodiment, the air is blown with a pressure of between 230 psi to 276 psi.

In one embodiment, the mold is between 50 to 60 degrees F.

In one embodiment, at least one of the heat pots is at a temperature between 100 to 240 degrees C. during the heating.

In one embodiment, the at least one of the heat pots is at a temperature between 165 to 180 degrees C. during the heating.

In one embodiment, the at least one of the heat pots is at a temperature between 100 to 135 degrees C. during the heating.

In one embodiment, the at least one of the heat pots is at a temperature between 215 to 235 degrees C. during the heating.

In one embodiment, at least one of the heat pots is set at ambient air temperature during the heating.

In one embodiment, advancing the nozzle into the open end of the heated preform vessel stretches the preform vessel from a first length to a second length.

In one embodiment, the heating step enhances clarity of the preform vessel

In one embodiment, the heated preform vessel is deformable.

In one embodiment, the method further comprises cooling the heated preform vessel in ambient air before the blowing step.

In one embodiment, the chemical composition is injected to form the preform vessel at an injection time of between 11 and 13 seconds, and wherein the temperature of at least one of the heat pots is based on the injection time.

In one embodiment, the chemical composition is injected to form the preform vessel by a barrel having a temperature of approximately 230 degrees C., and wherein the temperature of at least one of the heat pots is based on the temperature of the barrel.

In one embodiment, the chemical composition is injected to form the preform vessel by a barrel nozzle having a temperature of approximately 180 degrees C., and wherein the temperature of at least one of the heat pots is based on the temperature of the barrel.

In one embodiment, the second vessel as formed by the method is provided.

In one embodiment, a non-transitive computer readable medium comprising instructions configured to operate a processor to instruct machinery to perform the method is provided.

In one embodiment, a method may include providing a chemical composition comprising polypropylene, and forming a plurality of preform vessels of the chemical composition, each preform vessel having an open end. The method may include heating the plurality of preform vessels with a conditioning apparatus comprising a plurality of sets of heat pots, wherein each set of the heat pots is configured to heat a corresponding one of the preform vessels, wherein for each set, each the plurality of heat pots in the corresponding set is configured to heat the corresponding preform vessel at a plurality of positions on the preform vessel by raising a temperature of the heat pot to a respective temperature, wherein for each set, a respective temperature of a first one of the heat pots in the corresponding set is different from another respective temperature of a second one of the heat pots, the set of respective temperatures corresponding to each of the heat pots in a corresponding set being comprised in a respective profile, and wherein the profile of the respective temperatures of the heats pots in each set of the heat pots is different from the profile of the respective temperatures of the heats pots in another set of the heat pots. The method may include advancing nozzles into the open end of each of the heated preform vessels, covering the heated preform vessels and corresponding nozzle with molds, each mold having an cavity having an internal surface shaped corresponding to a desired shape, blowing air through the nozzles and into the heated preform vessels, wherein the blown air expands the heated preform vessels to couple the expanded preform vessels with the internal surface of the respective cavity, and forming, from the expanded preform vessels and within the cavities, a plurality of expanded product vessels in the corresponding desired shape.

In one embodiment, the expanded product vessels as formed by the method are provided.

In one embodiment, a method of forming a product in a desired first shape may include determining a plurality of heating profiles, each heating profile including a set of respective temperatures corresponding to each of a plurality of heat pots in a corresponding set of heat pots, wherein the determination of the plurality of profiles is based on (i) a shape of a preform vessel of a chemical composition comprising polypropylene, (ii) the desired shape of the product, and (iii) a barrel temperature providing the chemical composition for the preform vessel, wherein the profile of the respective temperatures of the heats pots in each set of the heat pots is different from the profile of the respective temperatures of the heats pots in another set of the heat pots. The method may include heating a plurality of preform vessels at a plurality of positions on a respective preform vessel with the heat pots in accordance with the corresponding determined plurality of heating profiles. The method may include advancing nozzles into the open end of each of the heated preform vessels, and covering the heated preform vessels and corresponding nozzle with molds, each mold having a cavity having an internal surface shaped corresponding to the desired first shape. The method may include blowing air through the nozzles and into the heated preform vessels, wherein the blown air expands the heated preform vessels to couple the expanded preform vessels with the internal surface of the respective cavity, and forming, from the expanded preform vessels and within the cavities, a plurality of expanded product vessels.

In one embodiment, the expanded product vessels as formed by the method are provided.

BRIEF DESCRIPTION OF THE DRAWINGS

FIG. 5 is a schematic diagram of Stage A of the ISBM system in accordance with disclosed aspects.

FIG. 10 is a process profile for operation of the ISBM system in accordance with disclosed aspects.

DETAILED DESCRIPTION OF SELECTED EMBODIMENTS

A polypropylene bottle disclosed herein is formed using injection stretch blow molding (ISBM). The ISBM process for the polypropylene bottle may use a preform vessel and injection process that are distinct and different from those of the ISBM process for PET bottles.

Figure 1:
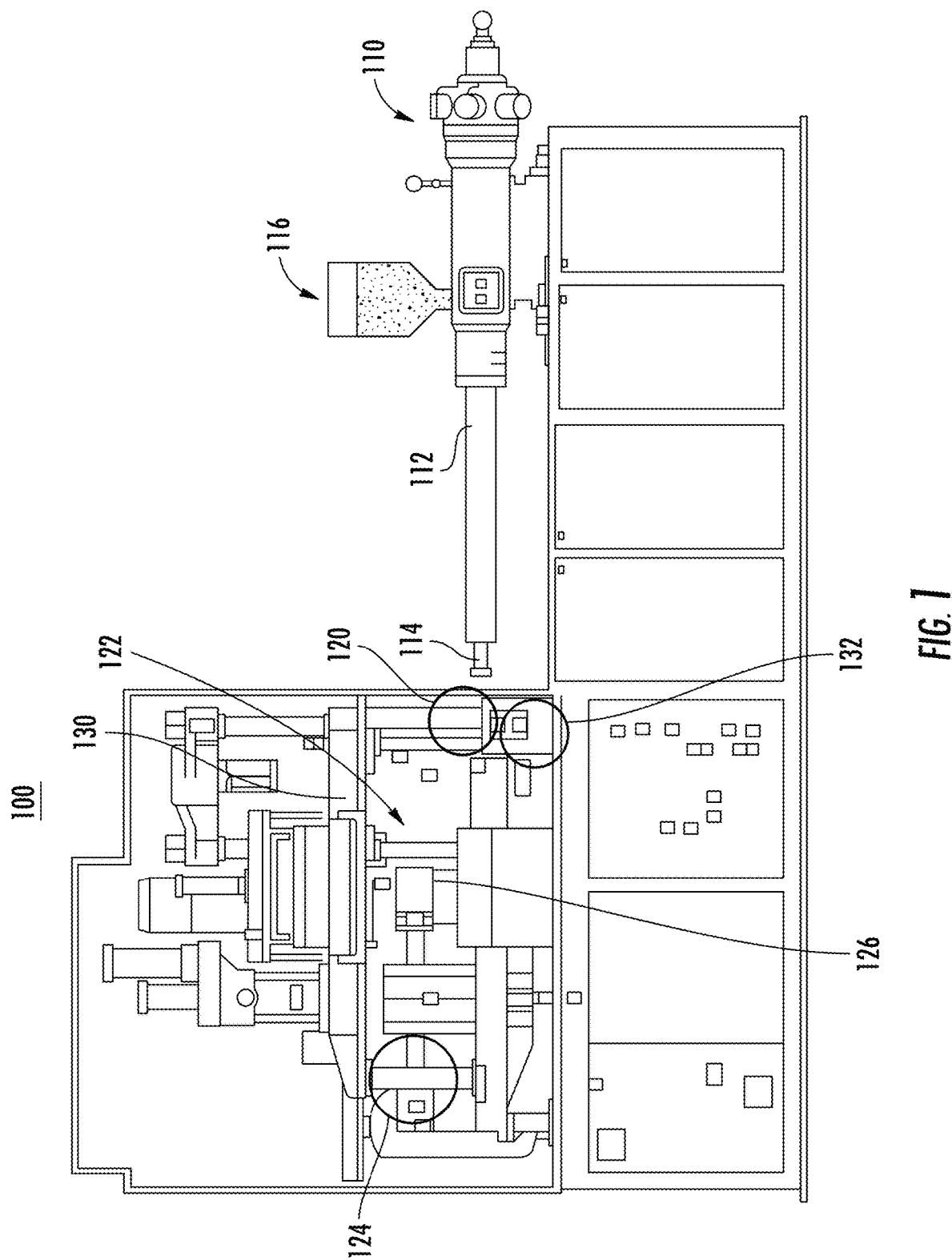
FIG. 1 is a side perspective view of an embodiment of the injection stretch blow molding (ISBM) system in accordance with disclosed aspects.
Figure 2:
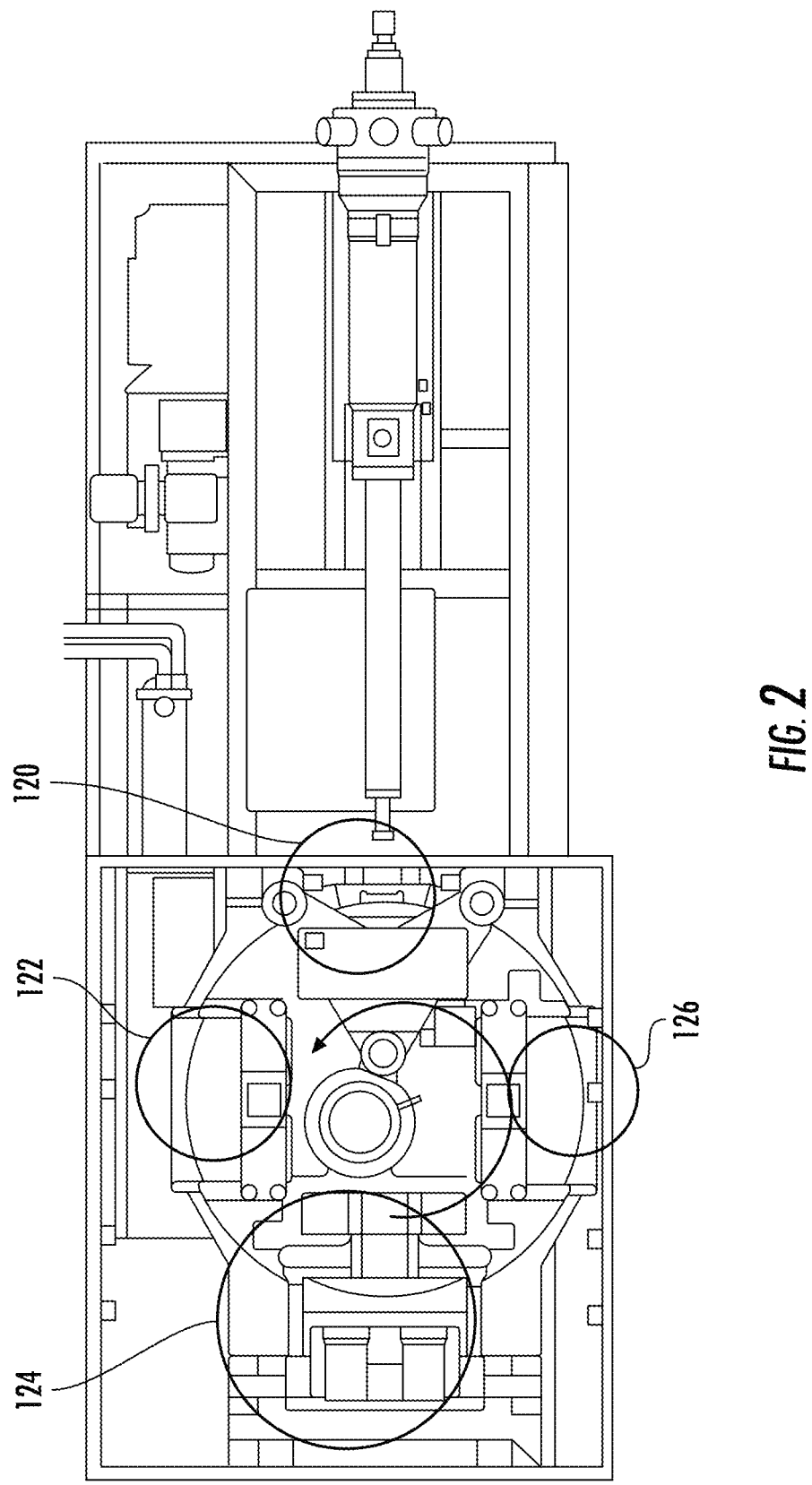
FIG. 2 is a top perspective view of an embodiment of the ISBM system in accordance with disclosed aspects.
Figure 3:
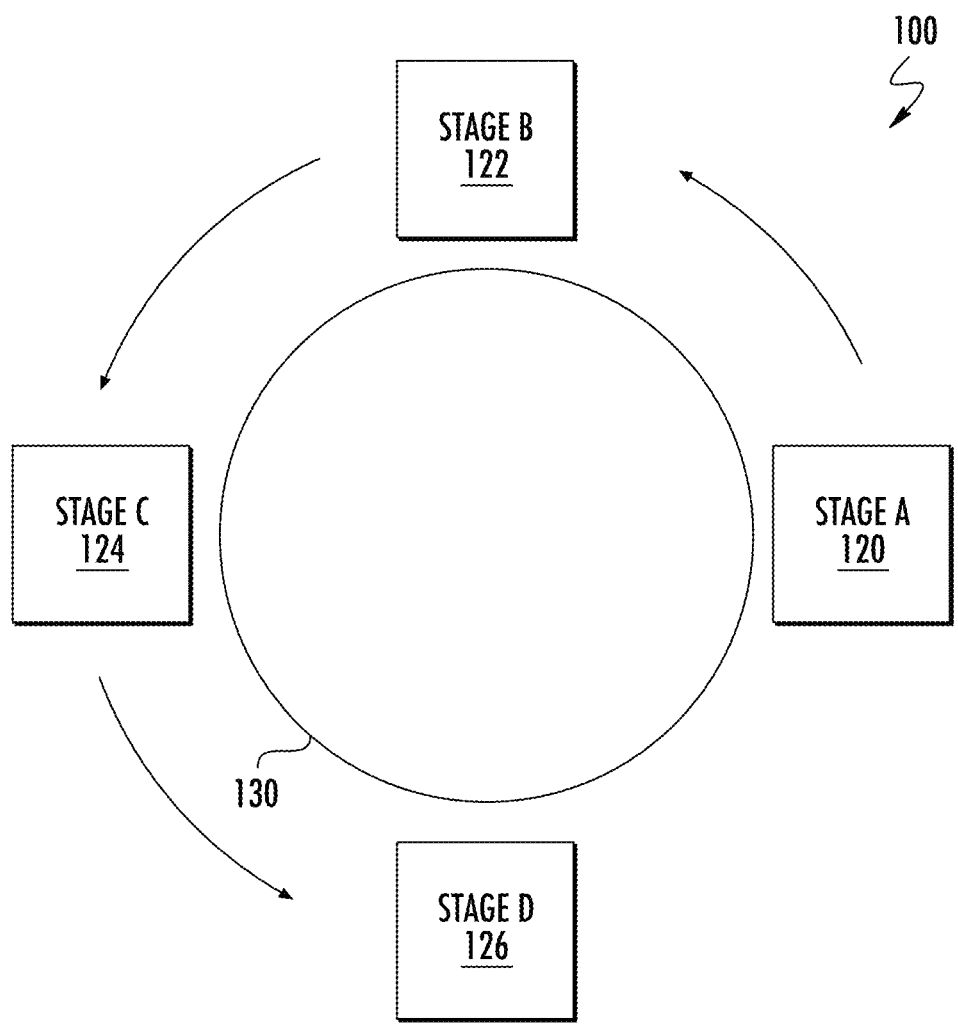
FIG. 3 is a schematic top view diagram of an embodiment of the ISBM system in accordance with disclosed aspects.

As shown in FIGS. 1-3, the ISBM process for forming the polypropylene bottle may be performed by a one-step ISBM system 100, such as a Nissei ASB-70DPH machine. Polypropylene (PP) is not conventionally used with these machines, as these machines are configured for molding PET material. The ISBM system 100 may include an injection unit 110, which may include a barrel 112, barrel nozzle 114, and hopper 116 used to store and feed in pellets of PP. The ISBM system 100 may include a substantially enclosed area that may include a first staging area 120 (Stage A), a second staging area 122 (Stage B), a third staging area 124 (Stage C), and a fourth staging area 126 (Stage D). The enclosed area may include a glass, plastic, or acrylic enclosure and may also include a rotary table 130, which may be circular in shape and may function to rotate in a circular shape from one stage to another stage. The ISBM system 100 may include a controller or processing device 132, which may function to operate or control any part of the ISBM machine 100. Each Stage A-D may be offset from one another by approximately 90 degrees around the rotary table 130.

In one embodiment in accordance with disclosed features, melted PP from the injection unit 110 may be pushed through the barrel 112 and barrel nozzle 114 into Stage A, where one or more preform vessels may be created using one or more preform molds. After the preform vessels are formed, the rotary table 130 may rotate or index to spin the preform vessels to Stage B, where the preform vessels may be conditioned by a heating apparatus. After the preforms are heated, the heated preforms may index via the rotary table 130 to Stage C, where the preforms may be stretched and blown into a bottle vessel. The formed bottles may index via the table to Stage D, where the formed bottles may cool with ambient air and may be ejected.

Figure 4:
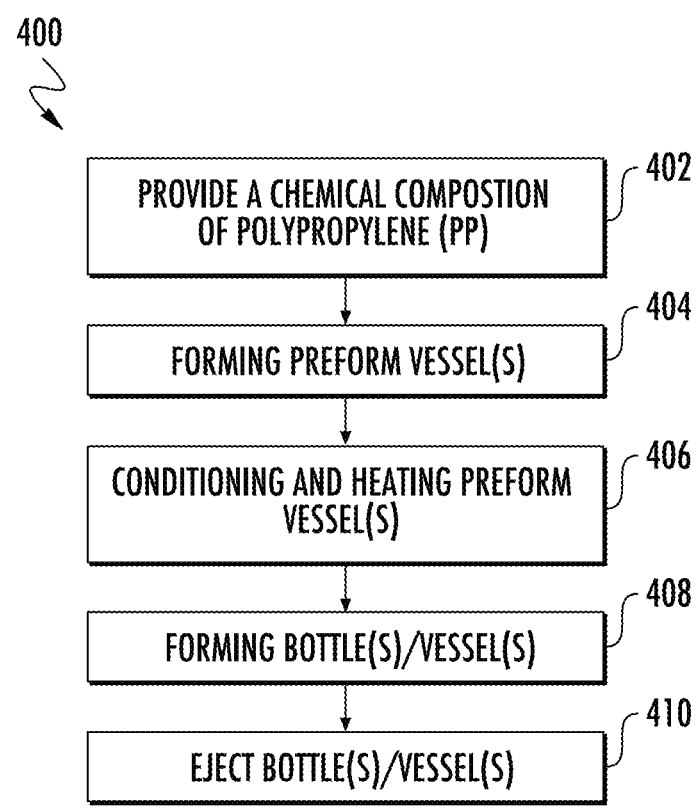
FIG. 4 is a flow diagram for a process of operating the ISBM system in accordance with disclosed aspects.

FIG. 4 illustrates an embodiment of a process 400 for molding a vessel in accordance with features described herein.

At step 402, a chemical composition containing polypropylene (PP) may be acquired and provided to ISBM system 100. For example, pellets of PP may be added to hopper 116. The PP pellets may be fed to the injection unit 110, which may include a hot runner that may melt the solid PP pellets and mix the melted PP with other chemical compositions, such as additives, clarifying agents, and the like. The melted chemical composition may move down barrel 112 to barrel nozzle 114, in which the barrel nozzle 114 may inject the melted chemical composition into one or more injection molds at Stage A of ISBM system 100.

At step 404, at Stage A of the system 100, the molds may form the melted chemical composition into one or more preforms made of the chemical composition. FIG. 5 is a schematic diagram showing an embodiment of Stage A. As shown in FIG. 5, a first portion 130a of rotary table 130 may attach to the formed preform vessels 202a, 202b, 202c, 202d. The upper portions of preform vessels 202a-d may attach to portion 130a, such that the preform vessels 202a-d may be suspended by the portion 130a. The rotary table 130 may function to spin the portion 130a counter-clockwise to Stage B.

The preform vessels 202a-d may have a generally tubular shape with an open upper end and a rounded closed lower end. In some embodiments, the shape of a preform vessel may be selected and formed based on the desired shape of the finished product or bottle. The upper end of the preform vessels 202a-d may include threads that may form a threaded neck of a finished ISBM polypropylene bottle vessel. In some embodiments, the ISBM process for polypropylene bottles may use a larger diameter nozzle tip of the nozzle 114 on the hot runner and a slower injection speed than is used in the ISBM process for PET bottles. In one embodiment, the injection time may be approximately 12 seconds, which may be slower than is used in the ISBM process for PET bottles. The hot runner, barrel 112, and hot runner nozzle tips 114 may be operated at lower temperatures when molding polypropylene bottles than may be used for the PET process. For example, the barrel 112 may be approximately 230 degrees C., the nozzle 114 may be at approximate 180 degrees C., and the hot runner may be at approximate 205-235 degrees C. The lower operation temperatures for PP may be due to polypropylene being generally more sensitive to changes in temperature. For example, changing a temperature by 2 degrees may greatly impact the material distribution of the PP chemical composition.

Figure 6A:
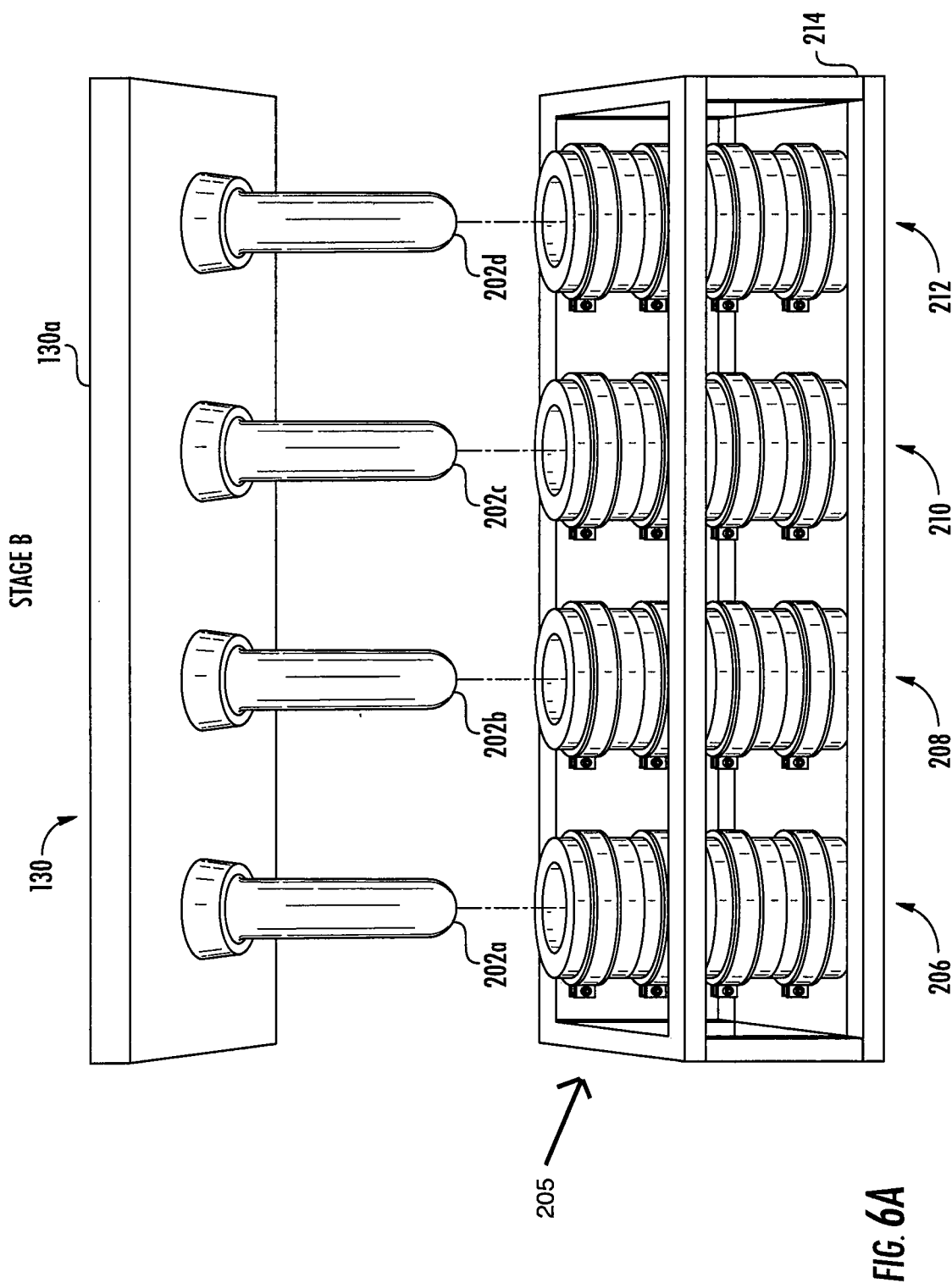
FIGS. 6A and 6B are schematic diagrams of Stage B of the ISBM system in accordance with disclosed aspects.
Figure 6B:
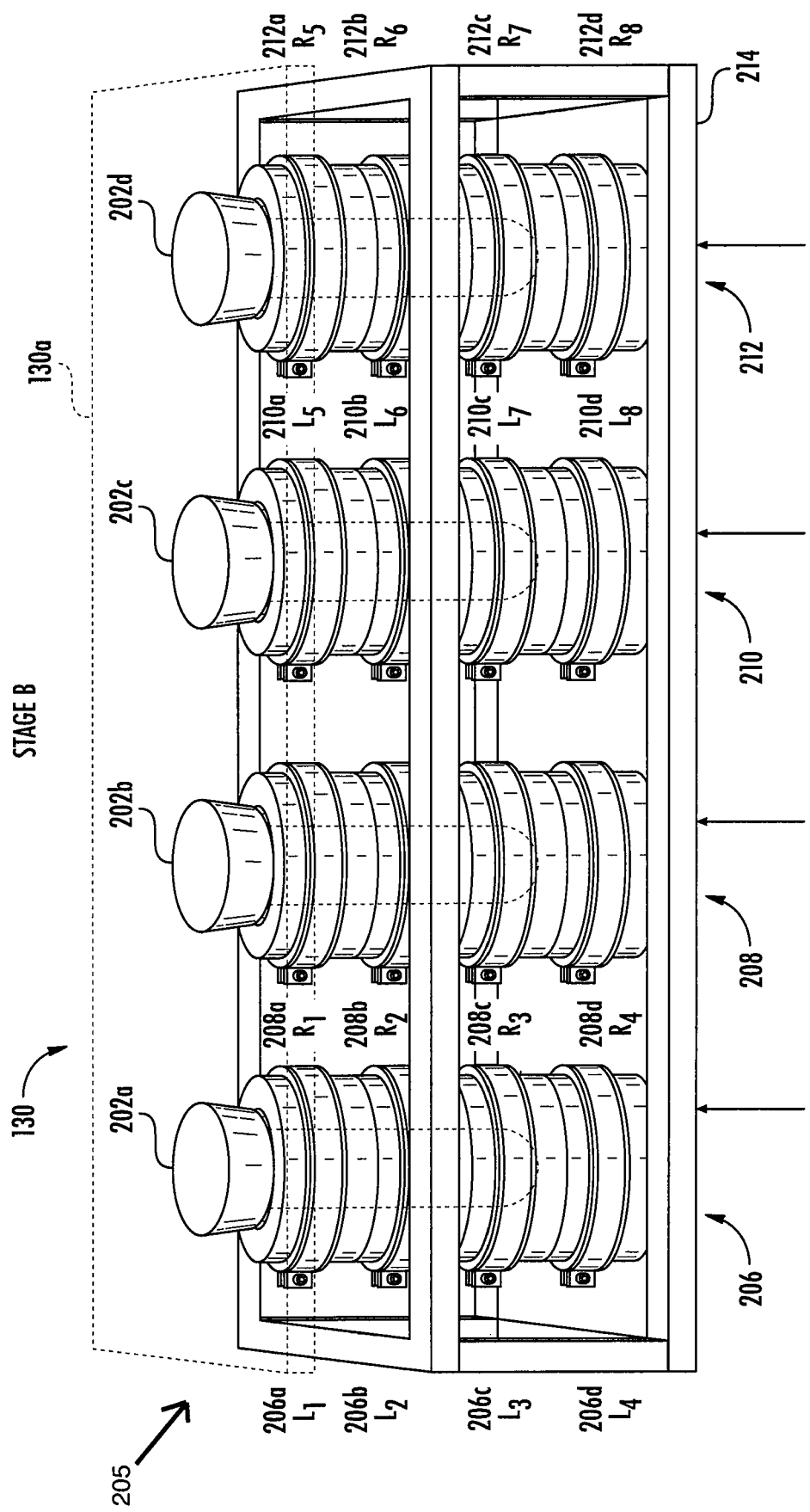

Referring back to FIG. 4, at step 406, after being indexed to Stage B, the formed preform vessels 202a-d may be conditioned by a conditioning device 205 at Stage B of system 100. The conditioning device 205 may be configured to heat the preform vessels 202a-d, such as to "condition" the vessels 202a-d for stretching and blowing at Stage C. Conditioning device 205 may include one or a plurality of heat pots, each including heating elements used to heat the preform vessels 202a-d. FIGS. 6A and 6B are schematic diagrams showing an embodiment of Stage B.

As shown in FIGS. 6A and 6B, conditioning device 205 may include one or more sets of heat pots 206, 208, 210, 212. Each set of heat pots may include one or more heat pots, 206a-d, 208a-d, 210 a-d, 212a-d. Even though four heat pots are shown for each set, any number of heat pots may be used or selected in accordance with a desired final vessel shape. In some embodiments, heat pots 206-212 may be ring or annular shaped. The sets of heat pots 206-212 may attach to a frame 214 and may operate as a unit. Frame 214 may move heat pots 206-212 up and down. For example, after the preform vessels 202a-202d move to Stage B, the frame 214 may raise the heat pots 206-212 from a lowered position upward to cover the preform vessels 202a-202d. The heat pots 206-212 may then be adjacent to the preform vessels 202a-202d and may heat the preform vessels 202a-202d by raising the temperature of the heat pots 206-212. After heating, frame 214 may lower the heat pots 206-212 back to the lowered position so that the heated preform vessels 202a-202d may index to Stage C.

In some embodiments, the arrangement of the temperature control elements of the heat pots 206-212 may be adjusted based on differing desired final product bottle shapes and geometries. For example, a 24 oz. oval shaped bottle may have a first arrangement of the heat pots 206-212, a 16 oz. oval shaped bottle may have a second arrangement of the heat pots 206-212, and a tubular shaped bottle may have a third arrangement of the heat pots 206-212. The arrangements may vary the distance between an adjacent heat pot (e.g., the linear distance between heat pot 206a and 206b, or the horizontal distance between heat pots 206a-d and heat pots 208a-d). In some embodiments, the heat pots 206-212 may include concentric arrangements, such as to wrap a heating element around a portion of another heating element. The selection of which portions of the preform vessels 202a-202d to heat may be based on the desired shape of the finished product. In some embodiments, the size of each heat pot in a set of heat pots 206-212 may vary (e.g., the sizes of heat pots 206a-206d may vary from one another).

Figure 7A:
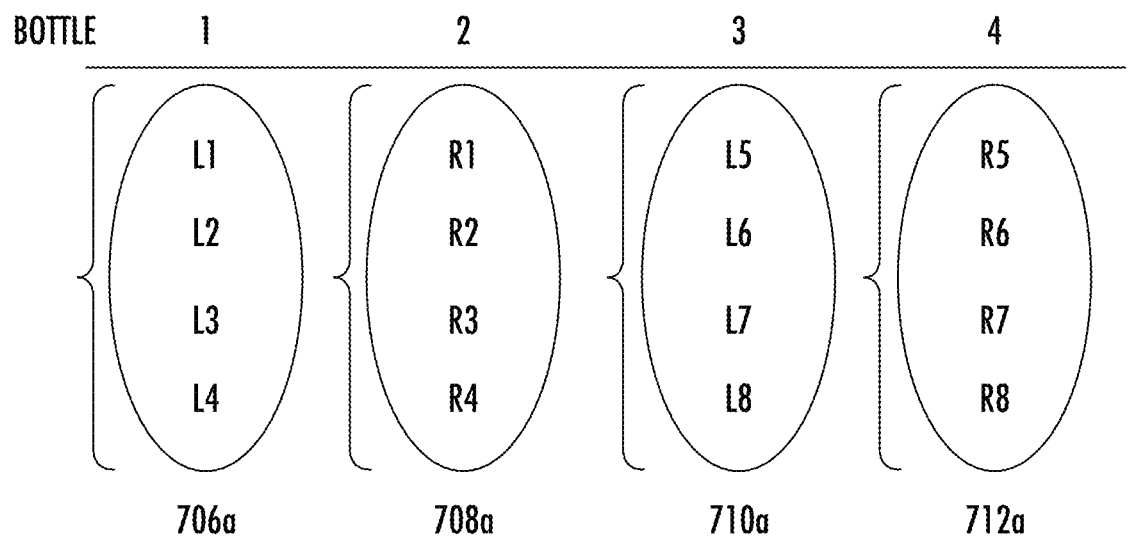
FIG. 7A is a chart of temperature profiles used in the ISBM system in accordance with disclosed aspects.
Figure 7B:
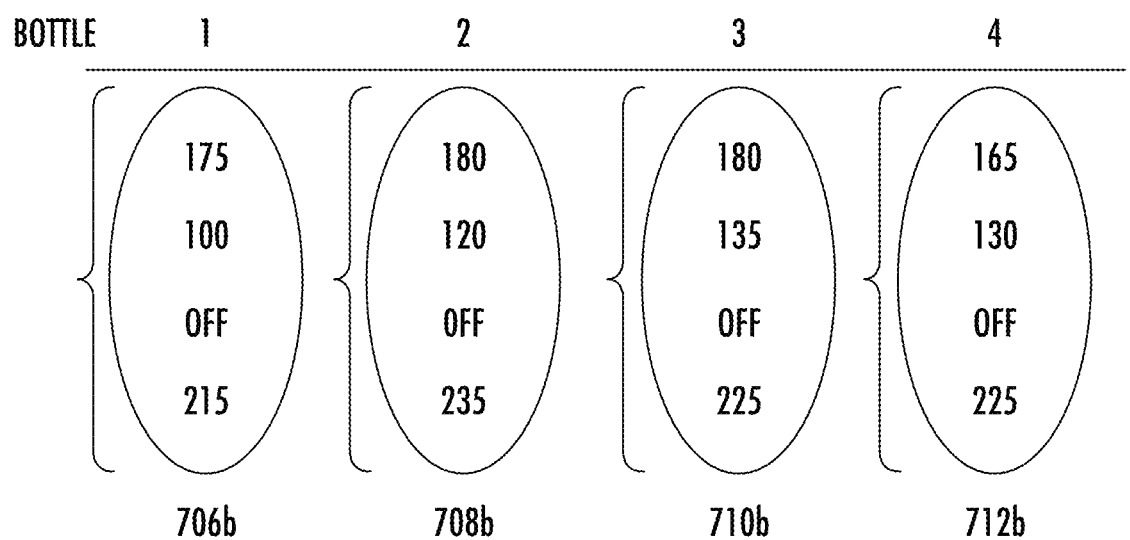
FIG. 7B is a chart of temperature profiles used in the ISBM system in accordance with disclosed aspects.

The conditioning step may operate to arrange the polypropylene molecule chains in preform vessels 202a-202d in preparation for Stage C. In order to produce bottles with differing and/or complex geometries, certain portions of the preform vessels 202a-202d may be needed to flow more in the molding step at Stage C than other portions, which may require differing degrees of heating in the conditioning step. To accomplish this, the temperatures of each of the heat pots 206-212 may be raised to respective temperatures that may differ from another respective temperature of another heat pot 206-212, where the temperatures of the heat pots 206-212 may be based on the desired shape of the finished product. FIGS. 7A and 7B illustrate example charts of temperature profiles for each of the sets of heat pots 206-212.

As shown in FIG. 7A, each set of heat pots 206, 208, 210, 212 may relate or correspond to a temperature profile, where each heat pot in each of the sets heat pots 206-212 may be set at a temperature in the respective temperature profile, such as to heat adjacent portions of a preform vessel 202a-202d at Stage B. The selection of which portions of the preform to heat and at which temperature may be based on the desired shape of the finished product. For the preform 202a, the first temperature profile 706a may include a set of temperatures L1, L2, L3, and L4 that may correspond to the temperatures set for each heat pot 206a-206d. Likewise, for preform 202b, the second temperature profile 708a may include a set of temperatures R1, R2, R3, and R4 that may correspond to the temperatures set for each heat pot 208a-208 d. For preform 202c, the third temperature profile 710a may include a set of temperatures L5, L6, L7, and L8 that may correspond to the temperatures set for each heat pot 210a-210d. For preform 202d, the fourth temperature profile 712a may include a set of temperatures R5, R6, R7, and R8 that may correspond to the temperatures set for each heat pot 212a-212d.

As shown in FIG. 7B, in one illustrative example, for the first preform 202a, the upper heat pot 206a may be set at 175 degrees C., the heat pot 206b may be set at 100 degrees C., the heat pot 206c may be set at ambient temperature and/or turned off, and the lower heat pot 206d may be set at 215 degrees C. The temperature profile 706b for the first preform 202a may be (175, 100, off, 215). Further shown in FIG. 7B, the temperature profile 708b for the preform 202b may be (180, 120, off, 235), the temperature profile 710b for the preform 202c may be (180, 135, off, 225), and the temperature profile 712b for the preform 202d may be (165, 130, off, 225).

Figure 9:
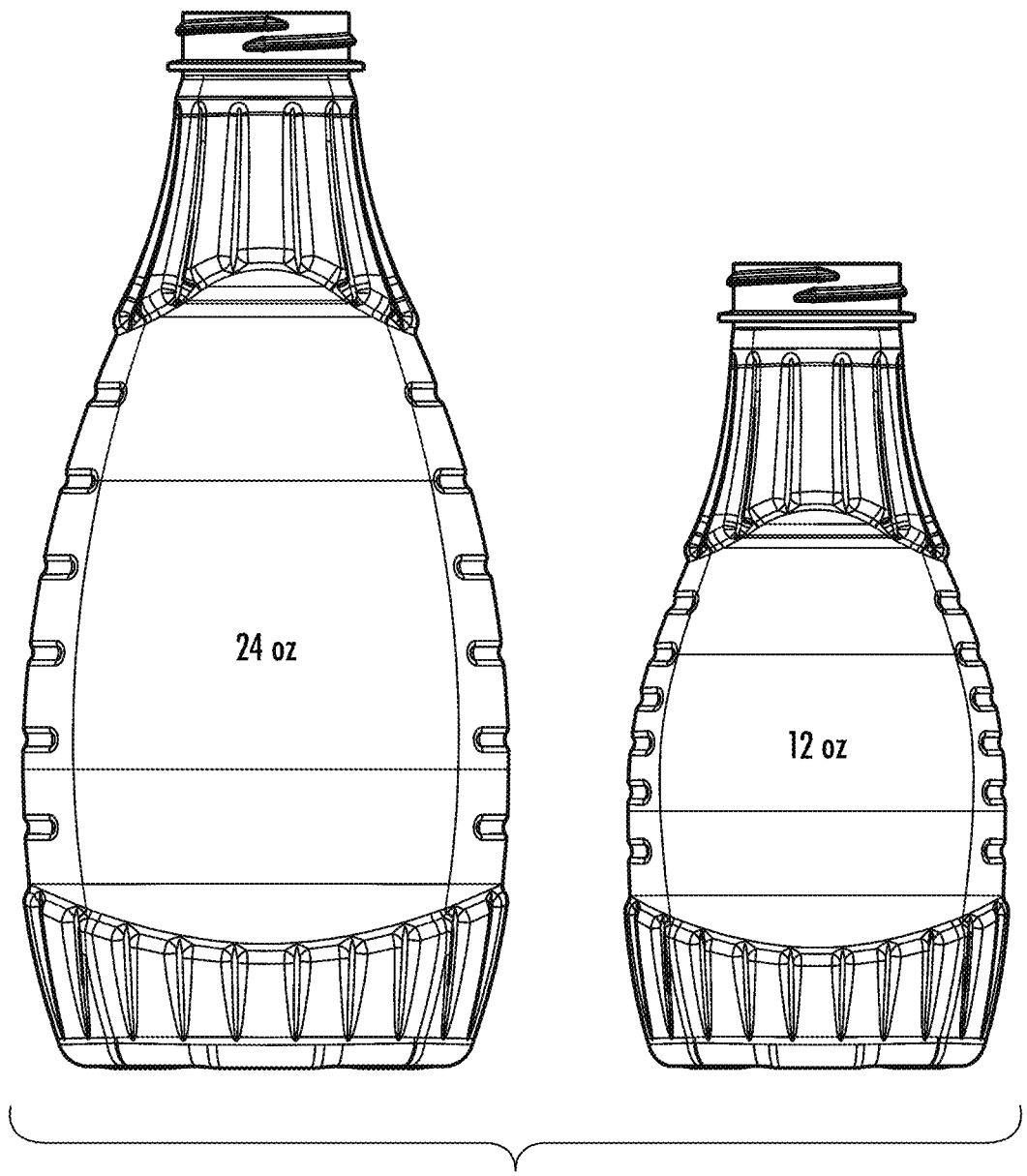
FIG. 9 illustrates a plurality of different bottle shapes made by one or more processes described herein in accordance with disclosed aspects.

In some embodiments, the set of temperature profiles illustrated in FIG. 7B may be for a 24 oz. oval-shaped bottle, such as shown in FIG. 9. Other temperature profiles may correspond to different sized and/or shaped bottles or vessels. In some embodiments, any one of heat pots in a set of heat pots 206-212 may be set at temperatures between 100 to 240 degrees C. during the heating. In some embodiments, any one of heat pots in a set of heat pots 206-212 may be set at temperatures between 165 to 180 degrees C. during the heating. In some embodiments, any one of heat pots in a set of heat pots 206-212 may be set at temperatures between 100 to 135 degrees C. during the heating. In some embodiments, any one of heat pots in a set of heat pots 206-212 may be set at temperatures between 215 to 235 degrees C. during the heating. In some embodiments, any one of heat pots in a set of heat pots 206-212 may be set at ambient temperature or at ambient air temperature during the heating. In some embodiments, all of the heating pots may be turned on and may generate heat, such that none of the heating pots are turned off.

In some embodiments, preform vessel 202a may be heated at a plurality of positions using heat pots 206a-d, where the time of the heating from each of the heat pots 206a-d may be different from another of the heat pots 206a-d. For example, the heat pot 206a may heat at the respective set temperature for 2.5 seconds, the heat pot 206b may heat at the respective set temperature for 3 seconds, and the heat pot 206d may heat at the respective set temperature for 3.5 seconds. In some embodiments, the selection of the timing of operation of the heat pots 206-212 may be based on the desired shape of the finished product.

In some embodiments, the temperature profiles 706a, 708a, 710a, 712a may be selected based on the injection time in which the chemical composition is injected from the barrel nozzle 114 at Stage A. For example, the temperature profiles 706b, 708b, 710b, 712b may correspond to an injection time of between 11 and 13 seconds.

In some embodiments, the temperature profiles 706a, 708a, 710a, 712a may be selected based on the barrel temperature or nozzle temperature when injection occurs at Stage A. For example, the temperature profiles 706b, 708b, 710b, 712b may correspond to a barrel temperature of 230 degrees C. and to a nozzle temperature of 180 degrees C.

According to some aspects, the heating performed at Stage B may enhance the clarity the preform vessels 202a-202d. For example, the preform vessels 202a-202d may be substantially translucent or opaque after Stage A. After Stage B, the preform vessels may be more transparent resulting from the conditioning preformed at Stage B.

According to some aspects, the heating performed at Stage B may increase the deformability of the preform vessels 202a-202d. For example, the preform vessels 202a-202d may be substantially rigid after Stage A. After Stage B, the preform vessels may be more flexible resulting from the conditioning performed at Stage B. In one embodiment, the preform vessel may flex when rotating on the rotary table 130 from Stage B to Stage C, such as to bend slightly upward to temporally form the shape of a banana. At Stage C, the heated preform may again be substantially tubular after the rotary table 130 stops moving.

In some embodiments, control device or processor 132 may operate the conditioning of preform vessels 202a-202d at Stage B. For example, control device 132 may determine and/or implement the temperature profiles 706a, 708a, 710a, 712a for corresponding heat pots 206-212. In some embodiments, control device or processor 132 may instruct the heat pots 206-212 to operate according to a specific timing and/or to a temperature profile 706a, 708a, 710a, 712a. In one embodiment, the control device 132 may communicate with non-transitive computer-readable memory to store instructions for performing the processes described herein, such as to facilitate the heating at Stage B.

Figure 8:
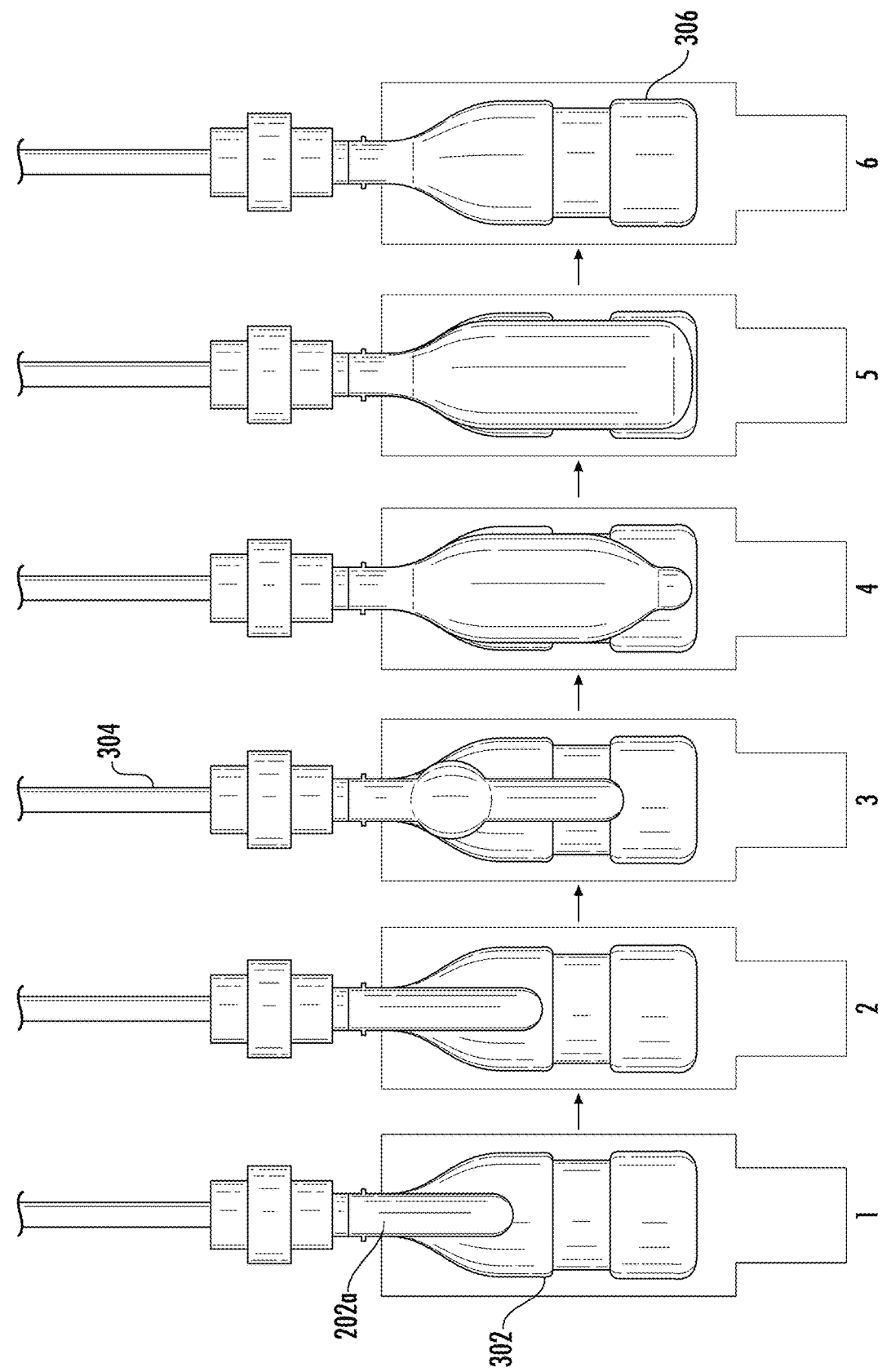
FIG. 8 is a schematic flow diagram for Stage C of the ISBM system in accordance with disclosed aspects.

Referring back to FIG. 4, at step 408, after the conditioning of the preform vessels 202a-202d at stage B, the rotary table may index the conditioned preform vessels 202a-202d to Stage C. At Stage C, the conditioned preform vessels 202a-202d may be stretched and blown into a final desired shape for a desired vessel or bottle. FIG. 8 is a schematic diagram showing an embodiment of Stage C. FIG. 8 illustrates a progression of phases 1-6 the conditioned preform may go through at Stage C. As shown in FIG. 8, at phase 1, a conditioned preform vessel 202a may be positioned in a mold cavity 302 that has an internal space corresponding to the shape of the desired bottle output. In some embodiments, the conditioned preform vessel 202a may cool in ambient air before being covered by the mold cavity 302.

At phase 2, a stretch rod nozzle 304 may be inserted into the inner space of the tubular preform 202a. At phase 3, the stretch rod nozzle 304 may force and extend the lower end of the preform 202a in a direction away from the upper end of the preform 202a, thereby lengthening and/or stretching the preform 202a. For example, the preform 202a may stretch from a first length to a second length. In some embodiments, the preform 202a may be stretched for approximately two seconds. At phase 4, a high pressure air stream may be injected into the inner space of the tubular preform by the nozzle 304. In some embodiments, the air may be blown with a pressure of between 230 psi and 276 psi.

At phase 5, the air may force the walls of the preform 202a outward into the shape of the mold cavity 302. In this way, the preform 202a may become a desired vessel shape that may correspond to the shape of the mold cavity 302. In some cases, the blown air may expand a heated preform vessel 202a to couple the expanded preform vessel 202a with the internal surface of the cavity 302. In some embodiments, the air may blow for approximately two seconds.

At phase 6, the blown preform vessel 202a may be allowed to cool within the mold cavity 302 before being ejected from the mold cavity 302. According to some aspects, the preform 202a may be in the mold cavity 302 for a total of approximately 15 seconds during phases 1-6 of Stage C. In some embodiments, the mold cavity 302 may be set at a low temperature, such as between 50 to 60 degrees F. The molding step involving stretching and blowing the polypropylene material may be more sensitive than a similar step in the ISBM process for PET bottles.

Referring back to FIG. 4, at step 410, the formed final bottle product vessel may be ejected from the mold cavity 302 and may be placed on a conveyor for inspection, wrapping, and/or packaging. The formed final bottle product vessel may have a threaded neck. The formed final bottle product vessel may include no vacuum panels, such as like PET bottles require.

FIG. 9 illustrates some example bottle shapes in desired final shapes that may be formed in accordance with disclosed aspects. For example, an oval shaped bottle having a volume of approximately 24 ounces may be formed in accordance with disclosed aspects. The oval shaped bottle may have a pattern or a textured detail on the outside, depending on the shape of the mold cavity 302. In another illustrated example, an oval shaped bottle having a volume of approximately 12 ounces may be formed in accordance with disclosed aspects. While FIG. 9 illustrates two bottle shapes, other bottle shapes are formable in accordance with disclosed aspects.

FIG. 10 illustrates a process profile for an embodiment of a disclosed method of manufacturing a polypropylene bottle, as described herein.

According to disclosed aspects, bottles made with the process described herein possess the characteristic of being slightly cloudy or semi-transparent when empty, but appear transparent when filled with a fluid. This characteristic may allow the amount of clarity agent added to the chemical composition to be lower than would be required for a more transparent empty bottle. This saves money by reducing the amount of money spent on clarity agent required to be added.

Figure 11A:
FIGS. 11A-11E illustrate pictures of bottles for water testing in accordance with disclosed aspects.
Figure 11B:
Figure 11C:
Figure 11D:
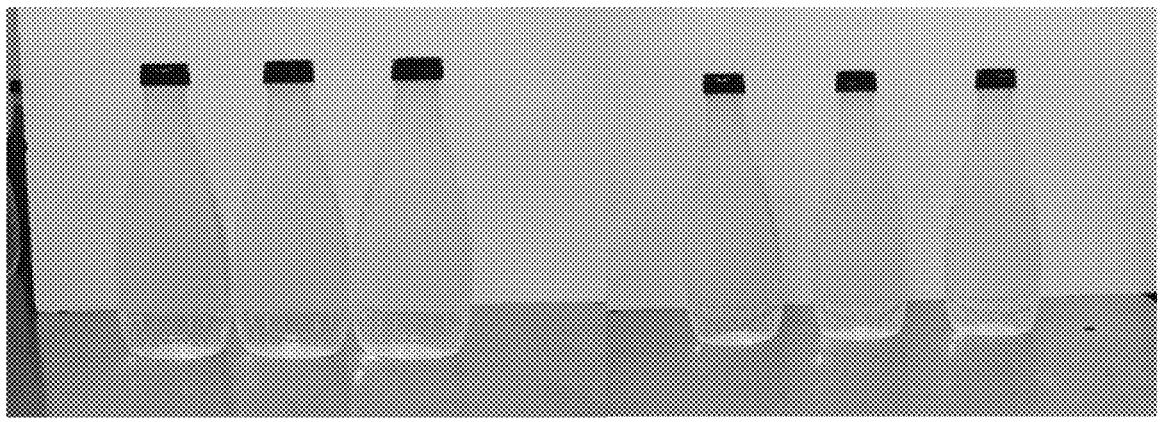
Figure 11E:
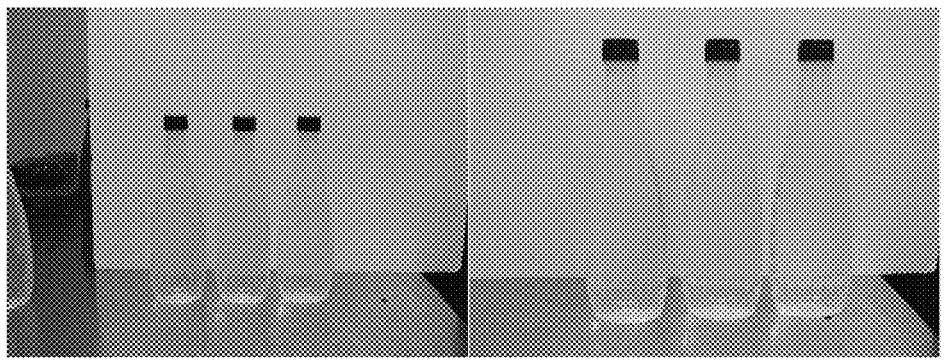
Figure 11F:
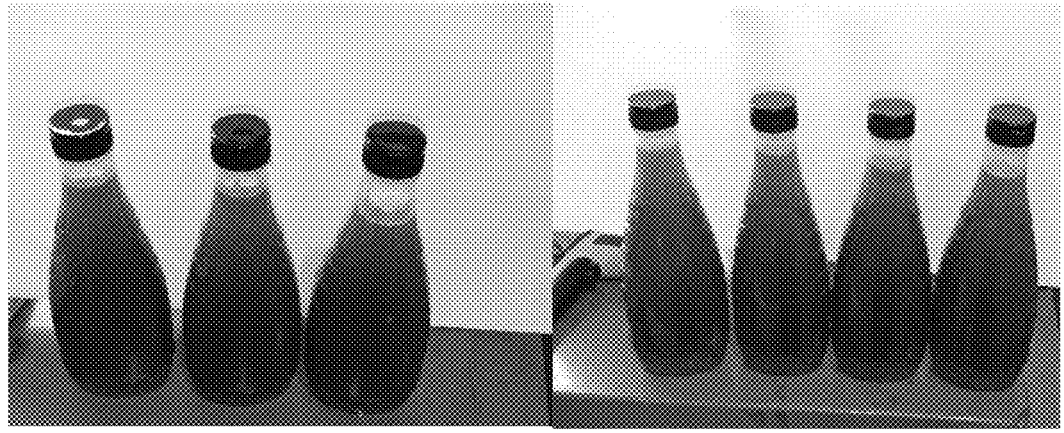
FIGS. 11F and 11G illustrate pictures of bottles for syrup testing in accordance with disclosed aspects.
Figure 11G:
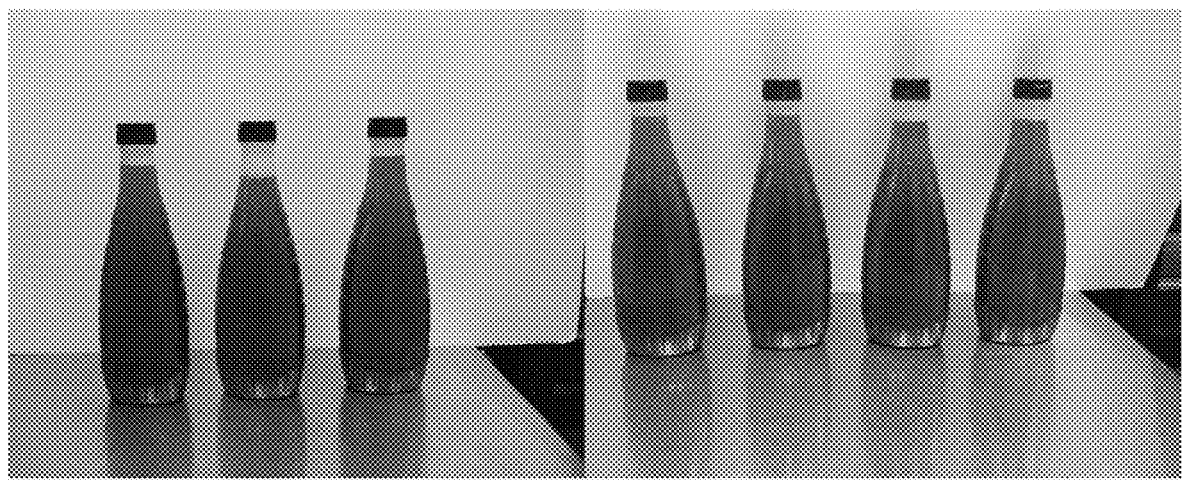

According to discloses aspects, bottles made with the process described herein possess the characteristic to withstand temperatures of liquid in the hot fill process as high as 212 degrees F. without deformation. According to some aspects, a final bottle product may have the property of holding liquid of between 204 degrees and 212 degrees F. without substantially deforming. For example, FIGS. 11A-11G illustrate final product bottle vessels formed and created during testing that were run in accordance with disclosed aspects. FIGS. 11A-11E illustrate water testing, and FIGS. 11F and 11G illustrate syrup testing. For the testing, the water temperature was 212 degrees F., and the syrup temperature was 206 degrees F.

As was observed from the testing, the bottles kept original form throughout hot filling, pre-cooling, and cool down process. One finding was while filling hot water all the way and capping, the water level came down, which may mean that the bottles expanded slightly before cooling. When cooled completely, however, the water level returned to the top to the original fill line. Syrup had similar results, with the only difference is that the levels stayed at the same level throughout hot filling, pre-cooling, and cool down process, which may be due to the consistency of the syrup.

For FIGS. 11A-11E, the ISBM polypropylene bottles were filled with hot water at 212° F. The bottles maintained the original form throughout the hot filling process, including the pre-cooling and cool down process. No deformation was observed. When the bottles were filled completely to the top of the bottle's neck with the hot water, the water level dropped after a cap was secured on the bottle as expected. This indicated that the bottle expanded slightly. When the water cooled completely, the water level returned to the top of the bottle. When the bottles were filled only to a fill line below the top of the bottle's neck, no water level change was observed after capping.

For FIGS. 11F and 11G, the ISBM polypropylene bottles were filled with syrup at 206° F. The bottles maintained the original form throughout the hot filling process, including the pre-cooling and cool down process. No deformation was observed. When the bottles were filled completely to the top of the bottle's neck with the hot syrup, the syrup level dropped after a cap was secured on the bottle as expected. This indicated that the bottle expanded slightly. The syrup level did not rise when cooling was complete, which was attributed to the syrup's consistency.

The ISBM polypropylene bottle made according to disclosed aspects offers many benefits over the bottles conventionally used for the hot fill process. Polypropylene bottles formed by extrusion blow molding are less expensive than PET bottles, especially PET bottles formed by heat set ISBM. But extruded polypropylene bottles may have only simple shapes or geometries. Additionally, extruded polypropylene bottles exhibit subpar sealing due to seams on the thread surfaces. PET bottles formed by heat-set ISBM require the use of expensive heat-set ISBM machines. These PET bottles must include vacuum panels for the hot fill process to allow for controlled contraction of the PET material as the contents in the bottle cool.

The ISBM polypropylene bottle made according to disclosed aspects is less expensive to produce than the PET heat-set ISBM bottles, but may include more complex shapes and geometries than the extruded polypropylene bottles. The disclosed ISBM polypropylene bottles do not require vacuum panels for use in the hot fill process. Instead, the ISBM polypropylene bottle's smooth side surfaces allow easier and more effective application of labels to the bottle. The ISBM polypropylene bottle also provides a superior thread-to-thread engagement between the threads on the bottle's neck and the threads of the cap.

The ISBM process times, machines, and equipment used with disclosed aspects may be the same as standard PET bottles. The preform geometry and injection process in accordance with disclosed aspects may be 20-30% slower than traditional PET, but provide advantages as discussed herein.

Each assembly described in this disclosure may include any combination of the described components, features, and/or functions of each of the individual assembly embodiments. Each method described in this disclosure may include any combination of the described steps in any order, including the absence of certain described steps and combinations of steps used in separate embodiments. Any range of numeric values disclosed herein shall be construed to include any subrange therein.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

What is claimed is:

1. A method of forming product vessels, comprising the steps of:
   a) providing a chemical composition comprising polypropylene;
   b) forming a plurality of preform vessels of the chemical composition, each preform vessel having an open end;
   c) heating the plurality of preform vessels with a conditioning apparatus comprising a plurality of sets of heat pots, wherein each set of the heat pots is configured to heat a corresponding one of the preform vessels,
   wherein for each set, each of the plurality of heat pots in the corresponding set is configured to heat the corresponding preform vessel at a vertical position on the preform vessel directly adjacent to the heat pot by raising a temperature of the heat pot to a respective temperature,
   wherein for each set, a respective temperature of a first one of the heat pots in the corresponding set is different from another respective temperature of a second one of the heat pots, the set of respective temperatures corresponding to each of the heat pots in a corresponding set being comprised in a respective profile,
   wherein the profile of the respective temperatures of the heat pots in each set of the heat pots is different from the profile of the respective temperatures of the heat pots in another set of the heat pots;
   wherein the chemical composition is injected to form each preform vessel at an injection time of between 11 and 13 seconds, and wherein for each of the plurality of sets of heat pots, the temperature of at least one of the heat pots is based on the infection time;
   d) advancing nozzles into the open end of each of the heated preform vessels;
   e) covering the heated preform vessels and corresponding nozzles with molds, each mold having a cavity with an internal surface shaped corresponding to a desired shape;
   f) blowing air through the nozzles and into the heated preform vessels, wherein the blown air expands the heated preform vessels to couple the expanded preform vessels with the internal surface of the respective cavity; and
   g) forming, from the expanded preform vessels and within the cavities, a plurality of expanded product vessels.

2. The method of claim 1, wherein the plurality of heat pots of each set of heat pots are annular in shape.

3. The method of claim 1, wherein the plurality of expanded product vessels each includes a threaded neck.

4. The method of claim 1, wherein the plurality of expanded product vessels each includes no vacuum panels.

5. The method of claim 1, wherein steps (b) through (g) are performed with a single-step Injection Stretch Blow Molding (ISBM) machine.

6. The method of claim 1, wherein the chemical composition comprises a clarity agent.

7. The method of claim 1, wherein each of the plurality of expanded product vessels has a property of holding liquid of between 204 degrees and 212 degrees F. without substantially deforming.

8. The method of claim 1, wherein for each of the plurality of preform vessels, the heating of the preform vessel comprises heating at a first vertical position on the preform vessel for a first time duration and heating at a second vertical position on the preform vessel for a second time duration.

9. The method of claim 8, wherein the first time duration is greater than the second time duration.

10. The method of claim 8, wherein the first time duration is between 2.5 and 3.5 seconds.

11. The method of claim 1, wherein the air is blown with a pressure of between 230 psi to 276 psi.

12. The method of claim 1, wherein the mold is between 50 to 60 degrees F.

13. The method of claim 1, wherein for each of the plurality of sets of heat pots, at least one of the heat pots is at a temperature between 100 to 240 degrees C. during the heating.

14. The method of claim 13, wherein the at least one of the heat pots is at a temperature between 165 to 180 degrees C. during the heating.

15. The method of claim 13, wherein the at least one of the heat pots is at a temperature between 100 to 135 degrees C. during the heating.

16. The method of claim 13, wherein the at least one of the heat pots is at a temperature between 215 to 235 degrees C. during the heating.

17. The method of claim 1, wherein for each of the plurality of sets of heat pots, at least one of the heat pots is set at ambient air temperature during the heating.

18. The method of claim 1, wherein advancing the nozzles into the open ends of the heated preform vessels stretches each preform vessel from a first length to a second length.

19. The method of claim 1, wherein the heating step enhances clarity of each preform vessel.

20. The method of claim 1, wherein each heated preform vessel is deformable.

21. The method of claim 1, further comprising cooling each heated preform vessel in ambient air before the blowing step.

22. A non-transitive computer readable medium comprising instructions configured to operate a processor to instruct machinery to perform the method of claim 1.

23. A method of forming product vessels, comprising the steps of:

a) providing a chemical composition comprising polypropylene;
b) forming a plurality of preform vessels of the chemical composition, each preform vessel having an open end;
c) heating the plurality of preform vessels with a conditioning apparatus comprising a plurality of sets of heat pots, wherein each set of the heat pots is configured to heat a corresponding one of the preform vessels,
wherein for each set, each of the plurality of heat pots in the corresponding set is configured to heat the corresponding preform vessel at a vertical position on the preform vessel directly adjacent to the heat pot by raising a temperature of the heat pot to a respective temperature,
wherein for each set, a respective temperature of a first one of the heat pots in the corresponding set is different from another respective temperature of a second one of the heat pots, the set of respective temperatures corresponding to each of the heat pots in a corresponding set being comprised in a respective profile,
wherein the profile of the respective temperatures of the heat pots in each set of the heat pots is different from the profile of the respective temperatures of the heat pots in another set of the heat pots;
wherein the chemical composition is injected to form each preform vessel by a barrel having a temperature of approximately 230 degrees C., and wherein for each of the plurality of sets of heat pots, the temperature of at least one of the heat pots is based on the temperature of the barrel;
d) advancing nozzles into the open end of each of the heated preform vessels;
e) covering the heated preform vessels and corresponding nozzles with molds, each mold having a cavity with an internal surface shaped corresponding to a desired shape;
f) blowing air through the nozzles and into the heated preform vessels, wherein the blown air expands the heated preform vessels to couple the expanded preform vessels with the internal surface of the respective cavity; and
g) forming, from the expanded preform vessels and within the cavities, a plurality of expanded product vessels.

24. A method of forming product vessels, comprising the steps of:
a) providing a chemical composition comprising polypropylene;
b) forming a plurality of preform vessels of the chemical composition, each preform vessel having an open end;
c) heating the plurality of preform vessels with a conditioning apparatus comprising a plurality of sets of heat pots, wherein each set of the heat pots is configured to heat a corresponding one of the preform vessels,
wherein for each set, each of the plurality of heat pots in the corresponding set is configured to heat the corresponding preform vessel at a vertical position of the preform vessel directly adjacent to the heat pot by raising a temperature of the heat pot to a respective temperature,
wherein for each set, a respective temperature of a first one of the heat pots in the corresponding set is different from another respective temperature of a second one of the heat pots, the set of respective temperatures corresponding to each of the heat pots in a corresponding set being comprised in a respective profile,
wherein the profile of the respective temperatures of the heat pots in each set of the heat pots is different from the profile of the respective temperatures of the heat pots in another set of the heat pots,
wherein the chemical composition is injected to form each preform vessel by a barrel nozzle having a temperature of approximately 180 degrees C., and wherein for each of the plurality of sets of heat pots, the temperature of at least one of the heat pots is based on the temperature of the barrel nozzle;
d) advancing nozzles into the open end of each of the heated preform vessels;
e) covering the heated Preform vessels and corresponding nozzles with molds, each mold having a cavity with an internal surface shaped corresponding to a desired shape;
f) blowing air through the nozzles and into the heated preform vessels, wherein the blown air expands the heated preform vessels to couple the expanded preform vessels with the internal surface of the respective cavity; and
g) forming, from the expanded preform vessels and within the cavities, a plurality of expanded product vessels.

25. A method of forming product vessels, comprising the steps of:
a) determining a plurality of heating profiles, each heating profile including a set of respective temperatures corresponding to each of a plurality of heat pots in a corresponding set of heat pots, wherein the determination of the plurality of heating profiles is based on (i) a shape of a preform vessel of a chemical composition comprising polypropylene, (ii) a shape of the product vessel to be formed, and (iii) a barrel temperature providing the chemical composition for the preform vessel, wherein the profile of the respective temperatures of the heats pots in each set of the heat pots is different from the profile of the respective temperatures of the heats pots in another set of the heat pots;
b) heating a plurality of preform vessels at a plurality of positions on a respective preform vessel with the heat pots in accordance with the corresponding determined plurality of heating profiles;
c) advancing nozzles into the open end of each of the heated preform vessels;
d) covering the heated preform vessels and corresponding nozzle with molds, each mold having a cavity having an internal surface shaped corresponding to the desired first shape;
e) blowing air through the nozzles and into the heated preform vessels, wherein the blown air expands the heated preform vessels to couple the expanded preform vessels with the internal surface of the respective cavity; and
f) forming, from the expanded preform vessels and within the cavities, a plurality of expanded product vessels.

* * * * *